(12) United States Patent
Herrendoerfer et al.

(10) Patent No.: US 6,612,490 B1
(45) Date of Patent: Sep. 2, 2003

(54) EXTENDED CARD FILE SYSTEM

(75) Inventors: Dirk Herrendoerfer, Sindelfingen (DE); Robert Sulzmann, Holzgerlingen (DE); Martin Welsch, Herrenberg (DE)

(73) Assignee: International Business Mahines Corporation, Armonk, NY (US)

( * ) Notice: Subject to any disclaimer, the term of this patent is extended or adjusted under 35 U.S.C. 154(b) by 0 days.

(21) Appl. No.: 09/465,169

(22) Filed: Dec. 17, 1999

(30) Foreign Application Priority Data

Dec. 22, 1998 (EP) .............................................. 98124504

(51) Int. Cl.⁷ .......................... G06F 19/00; G06G 17/80
(52) U.S. Cl. ....................... 235/407; 235/380; 235/382; 235/492; 235/487; 705/66; 395/600; 707/10
(58) Field of Search ................................ 235/407, 492, 235/382, 380; 705/66; 395/600; 707/10

(56) References Cited

U.S. PATENT DOCUMENTS

| | | | | | |
|---|---|---|---|---|---|
| 4,750,625 | A | * | 6/1988 | Frederick | 108/157.13 |
| 5,317,728 | A | * | 5/1994 | Tevis et al. | 707/204 |
| 5,463,772 | A | * | 10/1995 | Thompson et al. | 707/101 |
| 5,802,519 | A | * | 9/1998 | De Jong | 235/382 |
| 6,094,656 | A | * | 7/2000 | De Jong | 705/40 |
| 6,199,762 | B1 | * | 3/2001 | Hohle | 235/492 |
| 6,262,915 | B1 | * | 7/2001 | Kihara et al. | 365/185.11 |
| 6,419,161 | B1 | * | 7/2002 | Haddad et al. | 235/380 |

FOREIGN PATENT DOCUMENTS

JP     02000148567 A  *  5/2000

* cited by examiner

*Primary Examiner*—Karl D. Frech
*Assistant Examiner*—Daniel I Walsh
(74) *Attorney, Agent, or Firm*—Louis P. Herzberg; Anne V. Dougherty

(57) ABSTRACT

An Extended SmartCard file system is proposed which resides in one flat file within the ISO file system of a SmartCard. A second file containing user information like size of the file system, owner information, and key fields is used to configure the file system driver dynamically. However, this file may be omitted if the file system driver is statically initialized. The nested file system of the present invention has the advantage that files can be fully dynamically accessed and edited without affecting the underlying ISO file layout, i.e. the outer fixed structure of the outer file system. Further, data integrity and consistency are achieved by a transaction oriented commit concept. Additionally, all security mechanisms of the underlying SmartCards in terms of data protection are fully maintained and are enhanced in cases of power loss or unexpected card removal as two distinct directories are provided for data management.

23 Claims, 1 Drawing Sheet

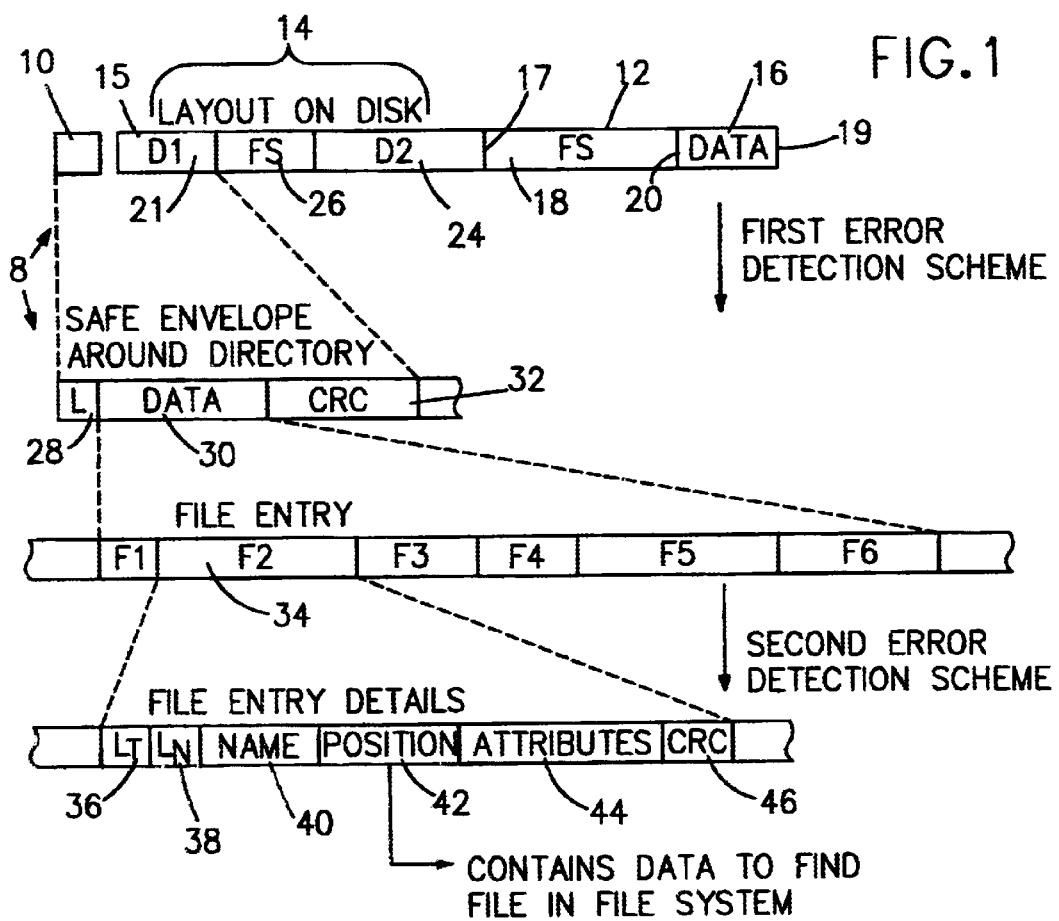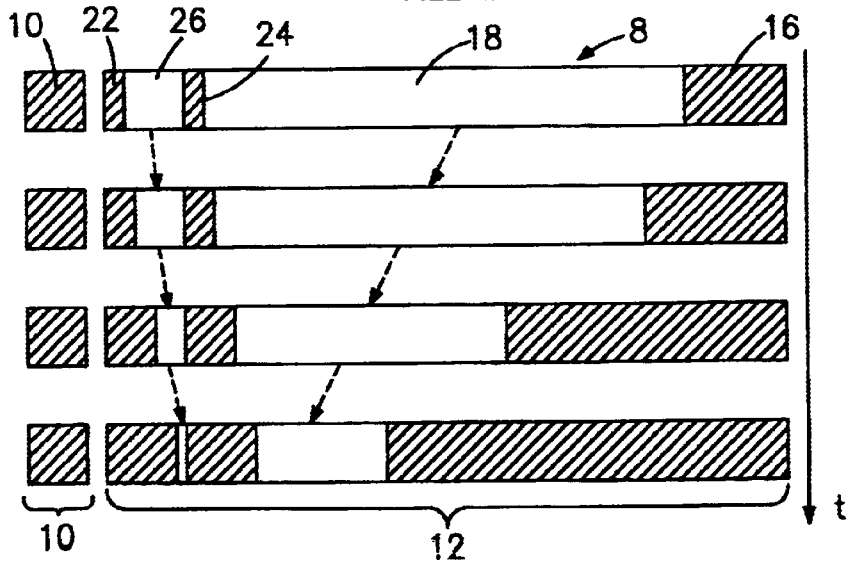

EXTENDED CARD FILE SYSTEM

FIELD OF THE INVENTION

The present invention relates to electronic data carrier file systems. In particular, the present invention relates to file systems for small hand held data carriers, particularly for SmartCards.

BACKGROUND OF THE INVENTION

A new area of technology with increasing importance is represented by the increasing use and acceptance of Smart-Cards and their applications for many different purposes.

Such applications need the ability to store data on media so that they can be retrieved at a later point in time. Under normal circumstances they use the file interface provided by the operating system on which the application is running. The operating system makes use of file systems to store the data on hardware and to keep the data consistent. Since SmartCards are not natively supported by any operating system this mechanism cannot be used for SmartCard enabled applications. SmartCards, have a static file system implemented into their functionality, i.e. the data stored on a smart card has to be described at the time the card is issued. Dynamic file allocation is therefore either not possible or very hard to accomplish.

Furthermore, dynamic file sizes are not supported by the ISO 7816 SmartCard file system.

Creating a new data file for each data object to store will be an ineffective way to store the data, because the file system overhead will reduce card free space and performance. Storing multiple data objects in one elementary file on the card will reduce the overhead of file headers, but a problem of ineffective accessing of the data objects still exists. Reserving fixed length records will waste file system space on the card.

Changing of file size can only be implemented by re-initializing the cards, which is only possible as long as they are not finalized, (i.e. closed before distribution to the end-users). Issuing open (i.e. not finalized) cards is not acceptable due to security reasons. In addition, files cannot be addressed by logical file names, but must rather be addressed by their file identifiers. This requires more effort and is not helpful for rapid prototyping efforts.

Further, the implementation of a dynamic file system onto a SmartCard imposes new problems since existing file systems generally depend on things like pre-allocated directories, cluster models, allocation bitmaps, etc. Since memory is always constrained on SmartCards and special problems like unexpected card-removal, fragmentation of files, and card diversity are always present, a new file system for the SmartCard needs to be developed.

Therefore, the primary object of the present invention is to provide a more flexible, improved file system.

It is another object of the present invention to provide such system which is compliant to the ISO 7816 SmartCard file system standard.

It is another object of the present invention to provide such file system with maximum utilization of the free card memory space.

A further object is to improve data security and consistency of such cards.

SUMMARY OF THE INVENTION

The foregoing and other objects are realized by the Extended SmartCard file system which resides in one flat file within the ISO file system of the SmartCard.

A second file, containing user information like size of the file system, owner information, and key fields, is used to configure the file system driver dynamically. However, this file may be omitted if the file system driver is statically initialized.

The nested file system of the present invention has the advantage, in relation to the method sketched out in the discussion of prior art technique that files can be fully dynamically accessed and edited without affecting the underlying ISO file layout, i.e. the outer fixed structure of the outer file system.

In a preferred embodiment of the inventive data managing method, data integrity and consistency are achieved by a transaction-oriented commit concept.

Additionally, all security mechanisms of the underlying SmartCards, in terms of data protection, are fully maintained. Moreover the security mechanisms are enhanced in cases of power loss or unexpected card removal since two distinct directories are provided for data management.

Further, the data storage supports human readable file names and fragmented file allocation, such that data can be stored in chunks, and the file system incorporates a defragmenting function.

Further, data compress and decompress operations are supported.

BRIEF DESCRIPTION OF THE DRAWINGS

The present invention is illustrated by way of example and is not limited by the shape of the Figures of the accompanying drawings in which:

FIG. 1 is a schematic sketch showing the overall structure and the organization of a preferred embodiment of the file system according to the invention, in the first row the overall system, and the following rows showing zoomed portions of the respective upper row, FIG. 2 is a schematic sketch showing the increasing storage of data at different times, each row corresponding at a particular time.

DESCRIPTION OF THE PREFERRED EMBODIMENT

With general reference to the Figures and with special reference now to FIG. 1 the overall structure and organization of a preferred embodiment of the file system 8 according to the invention is described in more detail. In the upper row of the Figure the overall system is shown, and the following rows thereunder each show zoomed portions of the respective upper row.

The overall file system 8 has two outer files 10, 12 in order to comply with ISO 7816. The overall file system size is thus fixed. The second file 10 is a small one compared to the first one 12 and contains information concerning the size of the overall file system, owner information and a key field. The first file 12 contains directory information in a first portion 14 starting at the front end 15 of the first file 12 and being delimited by a line 17, and user data 21 in a second portion 16 between the back end 19 and a line 20. Between the two is a first free space 18 available for being written basically with user data and to a small extent with directory information.

User data is deemed to contain generally the information essential for the business process in which the SmartCard is applied, (i.e. in case of a patient's medical insurance SmartCard, it could be data reflecting the patient's historic progress relative to particular diseases, etc.).

In the present preferred embodiment the directory information is maintained double at two distinct places 22 and 24 within the first portion 14. This is described in more detail in context with the inventive storing method down below.

Thus the first file's 12 basic layout can be summarized as follows:

"<DIRECTORY1><SMALL FREE SPACE><DIRECTORY2><LARGE FREE SPACE><FILE DATA>"

The layout of the file system is intentionally kept very simple. The two directories are placed at the beginning of the file space, and the user data is appended from the end. This simplicity enables low-end devices to access the file system 8, too.

Within the file system 8 all administration data is saved according to a preferred schema <LENGTH><DATA><CRC>" as it is shown in the second row of FIG. 1. In a data field 30 the particular use information is stored, the length field 28 describes the byte length of the data field 30, and (to insure that use data is correct) all important information blocks are appended by their respective cyclic redundancy check codes, for example, commonly used check sums, referred to as CRC. This insures that data read can be treated as trustworthy or not, since data existence and correctness can be controlled by first finding the length field, then advancing by the offset given by said length and then finding at this location a CRC which guarantees for data correctness in space there between.

The directory fields 22, 24, file-entries 34, and files, the latter two to be described down below—are structured according to that schema.

Thus, the basic layout of the directory information 22 and 24 is as follows:

"DIRECTORY1[<LENGTH><DATA><CRC>], DIRECTORY2[<LENGTH><DATA><CRC>]"

Thus, each of the directories 22, 24 has a length indication 28 covering the whole length of directory data 30 which is composed of a plurality of file entries 34. The correctness is checked by a first error detection scheme with the help of a checksum CRC 32. Further, by fields 28 and 32 a safe envelope is formed to separate the data contents of data 30 from the rest of the file system.

The basic function of the two directories is to provide a method of assuring consistency of the file system. When a new file is added on the file system 8 the data are updated, then both directories 22, 24 are updated—directory 22 first, then the directory 24.

Modifying is done in the order LENGTH, DATA, CRC. If the card holding the file system 8 is pulled from the reader during writing one of the directories will be inconsistent with the data while the other one will be correct.

The first directory 22 entry starts at block zero in the file system. The second directory 24 starts after the first, but at a multiple of $2^n$, wherein n can be determined at file system driver build time.

This means that there is a small block of free space 26 behind directory 22. This is left free, so succeeding file allocations can be performed faster. In the event that this second free-space 26 between directory 22 and directory 24 turns out to be not large enough, directory 24 gets moved to the next free multiple of $2^n$. In this event directory 24 gets updated before directory 22. If the card is removed during this operation, then, the file system can still be repaired, since directory 22 is either consistently reflecting the old state or directory 24 is already activated and reflecting the correct new state. This can happen when directory 22 is not valid anymore, or when the file system driver is able to look for a valid directory at all multiples of $2^n$.

Thus, the possible errors like defective directories, overlapping file, fragmentation indications, etc., from previous sessions are recovered by the file system driver as they can be found and corrected automatically with the above described consistency management.

With reference to the third and fourth row of FIG. 1 the layout of every file entry 34 in the directories 22, 24 is as follows:

"<LENGTH><DATA><CRC>" where DATA breaks up into

"<NAMELENGTH><NAME>STARTBLOCK><END BLOCK><ATTRIBUTE>"

Again, the layout is based upon the basic structure defined above for data entries within the file system. A first field 36 contains length information describing the total length of the directory file entry 34. A second field 38 contains length information relating to the file name in the subsequent field 40. Thus, file entries can be taken as plain text.

Next, in a position field 42 the start block and the end block of the user data file corresponding to the directory file entry 34 are written.

Next, in an attribute field 44 there may be additional attributes like time stamp, originator, etc., stored for each data object entry. This information can be advantageously used for a pre-selecting procedure, before reading the selected file itself. The attribute field 44 contained in the structure is an optional field. Its use can be decided upon by the application designer.

Finally, again a CRC field 46 completes the directory file entry 34. Thus, a second error detection scheme is established in order to control the correctness of each file entry 34.

Thus, by reading and processing the data contained in each file entry 34 the particular corresponding file located in the second portion 16 of the second file 12 can be found and read. Next, with additional reference to FIG. 2 the free space management will be described in more detail.

In FIG. 2 the increasing storage of data in the file system 8 by accumulating data in time is shown to different times, each row corresponding to a particular time. Time increases in down direction.

The second file 10 size remains constant in time. As indicated already above the directories 22, 24 grow from the beginning to the end of the card and the occupied file space 16 grows from the end to the beginning. The logical free-space 18 on the card is calculated by subtracting the used file space from the total space of the file system where the position of the second directory multiplied by 2 yields the length of directory entries which is included in that calculation. This calculation can be automatically done by the driver from mount time on.

As can be seen from the drawing, free space 18 located after directories 22, 24 is reduced when time increases. The inter-directory free space 26 is large enough for holding the file entries 34 necessary for managing data in the second portion 16 of the second file 12. Further, the size of the second file 12 is not changed during data accumulation, for example, because the number of file entries 34 was small enough.

When a SmartCard user wants to extend the file system by a file entry he calls to write a file. After mounting the card in a card reading device the file system driver allocates file space and directory space. Next, it writes the file data to the SmartCard. Then the driver appends a new directory entry 34 to directory 22. Then, the driver appends the same new directory 34 entry to directory 24, with all writing procedures performing the schema described above, i.e. <LENGTH><DATA><CRC>.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

What is claimed is:

1. An electronic data file system having an outer structure of fixed size, comprising:
   at least one first file part; and
   for each first file part, a further inner file system arranged for dynamic storage allocation operations;
   whereby, in said one first file part a first file containing user data adapted to allow read access according to ISO 7816 file system standard, and having in a first file portion, at least one directory comprising an aggregation of file entries each comprising at least data position information for finding said user data positioned in a second file portion.

2. The file system according to claim 1, characterized by comprising
   in said one part a first file containing user data adapted to allow read access according to ISO 7816 file system standard, and having in a first file portion, at least one directory comprising an aggregation of file entries each comprising at least data position information for finding said user data positioned in a second file portion.

3. The file system according to claim 2, characterized by further comprising:
   a second file containing identification data for configuring a file system driver dynamically.

4. The file system according to claim 3, characterized by said first portion and said second portion being comprised of a contiguous memory space having a front end and a back end, and said first portion starting from said front end and said second portion starting from said back end of said memory space.

5. The file system according to claim 2, characterized by said first portion and said second portion being comprised of a contiguous memory space having a front end and a back end, and said first portion starting from said front end and said second portion starting from said back end of said memory space.

6. The file system according to claim 4, wherein file entries in said at least one directory comprise use data comprising at least data length information and data control information.

7. The file system according to claim 5, wherein file entries in said at least one directory comprise use data comprising at least data length information and data control information.

8. The file system according to claim 6 wherein said data control information comprises checksum information.

9. The file system according to claim 7 wherein said data control information comprises checksum information.

10. The file system according to claim 2 wherein said first file portion comprises at least two directories each comprising a plurality of file entries.

11. The file system according to claim 3 wherein said first file portion comprises at least two directories each comprising a plurality of file entries.

12. The file system according to claim 3 arranged for an application in smart cards, characterized by said identification data being user identifying data for use in said smart cards.

13. The file system according to claim 11 arranged for an application in smart cards, characterized by said identification data being user identifying data for use in said smart cards.

14. A smart card comprising a file system having
   at least one first file part; and
   for each first file part, a further inner file system arranged for performing dynamic storage operations;
   whereby, in said one first file part a first file containing user data adapted to allow read access according to ISO 7816 file system standard, and having in a first file portion, at least one directory comprising an aggregation of file entries each comprising at least data position information for finding said user data positioned in a second file portion.

15. A method to manage data in a file system having an outer structure of fixed size comprising at least one first file part, said first file part having an inner file system arranged for performing dynamic storage operations, said inner file system comprising a first directory, a second directory and a user data storage area, comprising the steps of:
   in response to user data input, on each user data performing steps comprising:
      modifying said user data in said storage area based on said user data input;
      modifying the first directory according to said user data modification; and
      updating the second directory in accordance with said modifying.

16. The method according to claim 15 wherein said updating of said first and said second directories further comprise storing use data comprising at least data length information and a data control information.

17. The method according to claim 16, wherein said data control information comprises a data consistency checksum.

18. The method according to claim 15, wherein directory updating comprises updating at least one of directory data, directory file entries, file name, and file position data.

19. The method according to claim 16, wherein directory updating comprises updating at least one of directory data, directory file entries, file name, and file position data.

20. The method according to claim 17, wherein directory updating comprises updating at least one of directory data, directory file entries, file name, and file position data.

21. The method according to claim 15 wherein said file system comprises a file system for at least one smart card.

22. A program storage device readable by a machine tangibly embodying a program of instructions executable by the machine to perform method steps for managing data in a file system having an outer structure of fixed size comprising at least one first file part, said first file part having an inner file system arranged for performing dynamic storage operations, said inner file system comprising a first directory, a second directory and a user data storage area, said method steps comprising:
   performing a sequence of steps on each user data comprising:
      modifying said user data in said storage area;
      modifying the first directory according to said user data modification; and
      updating the second directory in accordance with said modifying.

23. The program storage device according to claim 22 wherein the file system comprises a file system for use with at least one smart card.

* * * * *